Patented Mar. 5, 1935

1,993,089

UNITED STATES PATENT OFFICE 1,993,089

PRODUCTION OF UNSATURATED ESTERS

John William Croom Crawford, Ardrossan, Scotland, assignor to Imperial Chemical Industries Limited, a corporation of Great Britain No Drawing. Application November 10, 1933, Serial No. 697,540. In Great Britain November 17, 1932

9 Claims. (Cl. 260—106)

The present invention relates to a method for the production of lower alkyl esters of alpha-alkyl substituted acrylic acids from the alpha hydroxy alpha-alkyl propionic acids.

The method of the invention is particularly suitable for the preparation of the methyl esters of such acids as methacrylic acid, and ethacrylic acid.

It is known that the ethyl ester of alpha-hydroxy-isobutyric acid may be dehydrated by means of phosphorus trichloride to yield the corresponding unsaturated ester, namely ethyl methacrylate, but in general it may be said that the reaction between dehydrating agents and alpha alkyl-substituted alpha-hydroxy-fatty acid esters does not result in a good yield of the corresponding unsaturated ester, since a side reaction accompanied by the splitting off of formic acid is very liable to occur. I have found, however, that the use of phosphorus oxychloride as dehydrating agent results in good yields of the above unsaturated esters. The present invention, therefore, consists in a method for the preparation of the lower alkyl esters of alpha alkyl-substituted acrylic acids from the alpha hydroxy derivatives of the corresponding esterified alkyl-substituted propionic acids, according to which the said esterified alpha hydroxy derivatives of the saturated fatty acids are caused to react with phosphorus oxychloride.

If desired, one molecular proportion of phosphorus oxychloride may be employed to every three molecular proportions of the hydroxy ester it is required to dehydrate, but rather larger yields of the unsaturated ester are obtained, with a correspondingly smaller recovery of undehydrated hydroxy ester, when this proportion of phosphorus oxychloride is slightly exceeded, e. g. when the proportion is about 1.5 molecules of phosphorus oxychloride to three of hydroxy ester. A still higher proportion does not appear still further to increase the yield.

The evolution of heat which occurs on mixing the two reagents is generally slight, and to facilitate the reaction I warm the reaction mixture under reflux, e. g. to boiling or to the temperature of boiling water, until there is no further visible evolution of hydrogen chloride. Moisture is excluded from the reaction mixture, for instance, by means of a calcium chloride tube between the reflux condenser and the atmosphere.

During the reaction some of the desired product may be carried away with the hydrogen chloride in the form of spray. It is, therefore, advisable to provide the reflux condenser with a suitable spray arrester to catch the entrained liquid and return it to the reaction vessel.

I have found that in this operation, as often occurs in the preparation of unsaturated esters, the product is liable to polymerize. To obviate this I prefer to add a small quantity of an anti-polymerization material, e. g. hydroquinone, sulphur, or copper, to the reaction mixture, and I prefer that the product should be in contact with such an anti-polymerization material while it is being purified even after its separation from the reaction mixture. After the reaction appears to be complete the liquid contents of the reaction vessel are heated to a considerably higher temperature and the unsaturated ester is distilled off together with any residual phosphorus oxychloride, or unchanged hydroxy-ester, if desired under reduced pressure, until the temperature of the liquid approaches 200° C. When excess of phosphorus oxychloride has been used, a preliminary fractional distillation may be carried out and the ester fraction may then be purified by shaking it with an alkali or alkali metal carbonate solution to remove acidic impurities and then with water, in which case it is dried, for instance by standing over anhydrous calcium chloride or sodium sulphate, after which it may be fractionally distilled under ordinary or reduced pressure. If no excess of phosphorus oxychloride has been used, a certain amount of the unchanged hydroxy ester is to be expected, and the condensate may conveniently be fractionated to recover this substance, after which the unsaturated fraction may be washed, dried, and fractionally distilled. It will be understood that the method of purification is not in itself a characteristic feature of the invention and that the choice of a suitable method is a matter which will present no difficulty to the skilled worker. The invention is illustrated but not limited by the following examples in which the parts are by weight.

*Example 1.*—118 parts (1 mol.) of methyl alpha-hydroxyisobutyrate are mixed with 77 parts (1.5 mol.) of phosphorus oxychloride and the mixture is boiled for half an hour under reflux fitted with spray arrester, in presence of 0.1 part of sulphur or hydroquinone to prevent polymerization of the methacrylate formed. At the expiry of this time, the mixture is distilled from an oil bath, up to an (external) temperature of 200° C. The temperature of the distilling vapor does not exceed 100° C. The distillate after purification by washing with dilute alkali, then water, and drying over anhydrous calcium chloride gives 76 parts of methyl methacrylate boiling mainly between 95 and 101.5° C.

*Example 2.*—118 parts of methyl alpha-hydroxy isobutyrate (1 mol.) are mixed with 51 parts (0.33 mol.) of phosphorus oxychloride, 0.1 part of hydroquinone are added, and the mixture is heated on a water bath under a reflux condenser fitted with a spray trap for 4 hours. The reaction mixture is then distilled from an oil bath until the temperature of the latter reaches 200° C., and no more distillate passes over. In this case, the temperature of the vapor passing over may reach 120° C. To the distillate 0.1 part of hydroquinone is added, and after washing with water and with 5% sodium carbonate, and drying over calcium chloride, 65 parts of methyl methacrylate, boiling between 95° and 105°, and 24 parts of unchanged methyl alpha-hydroxyisobutyrate are obtained.

I claim:

1. Process for the production of lower alkyl esters of alpha alkyl-substituted acrylic esters which comprises reacting the corresponding lower alkyl ester of an alpha hydroxy alkyl-substituted propionic acid with phosphorus oxychloride.

2. Process as in claim 1 wherein the reaction mixture is subjected to heat and distilled and the unsaturated ester is recovered from the distillate.

3. Process as in claim 1 wherein the molal ratio of phosphorus oxychloride to ester in the mixture submitted to reaction is at least 1.

4. Process as in claim 1 wherein the molal ratio of phosphorus oxychloride to ester in the mixture submitted to reaction is within the range of from slightly more than 1 to 1.5.

5. Process as in claim 1 wherein the lower alkyl ester is the methyl ester.

6. Process as in claim 1 wherein the ester used is an ester of alpha-hydroxy isobutyric acid.

7. Process as in claim 1 wherein an antipolymerization substance selected from the group consisting of hydroquinone, copper, and sulphur is present in the heated reaction mixture.

8. Process as in claim 1 wherein an antipolymerization substance selected from the group consisting of hydroquinone, copper, and sulphur is present throughout the purification of the distillate containing the unsaturated ester.

9. Process for the production of lower alkyl esters of alpha alkyl substituted acrylic esters which comprises heating from 1 to 1.5 mols of phosphorus oxychloride with 1 mol. of a lower alkyl ester of an alpha hydroxy alkyl substituted propionic acid, in the presence of an antipolymerization substance selected from the group consisting of hydroquinone, copper, and sulfur, and when reaction has been substantially completed, distilling the reaction mixture and recovering the unsaturated ester from the distillate.

JOHN WILLIAM CROOM CRAWFORD.